US008468545B2

(12) United States Patent
Townsend et al.

(10) Patent No.: US 8,468,545 B2
(45) Date of Patent: Jun. 18, 2013

(54) INTERACTION MANAGEMENT

(75) Inventors: Robert Townsend, Mt. View, CA (US);
Praveen Hegde, Santa Clara, CA (US);
Sui Heung Zoe Li, Union City, CA (US)

(73) Assignee: 8x8, Inc., San Jose, CA (US)

( * ) Notice: Subject to any disclaimer, the term of this patent is extended or adjusted under 35 U.S.C. 154(b) by 299 days.

(21) Appl. No.: 12/858,814

(22) Filed: Aug. 18, 2010

(65) Prior Publication Data

US 2012/0047517 A1 Feb. 23, 2012

(51) Int. Cl.
*G06F 9/44* (2006.01)
*G06F 15/173* (2006.01)

(52) U.S. Cl.
USPC ........................................................ 719/313

(58) Field of Classification Search
USPC ........................................................ 719/313
See application file for complete search history.

(56) References Cited

U.S. PATENT DOCUMENTS

| 5,634,127 | A * | 5/1997 | Cloud et al. ................. 719/313 |
| 5,887,139 | A | 3/1999 | Madison, Jr. et al. |
| 6,005,931 | A | 12/1999 | Neyman et al. |
| 6,154,465 | A | 11/2000 | Pickett |
| 6,201,863 | B1 | 3/2001 | Miloslavsky |
| 6,278,777 | B1 | 8/2001 | Morley et al. |
| 6,393,467 | B1 | 5/2002 | Potvin |
| 6,553,115 | B1 | 4/2003 | Mashinsky |
| 6,687,241 | B1 | 2/2004 | Goss |
| 6,741,698 | B1 | 5/2004 | Jensen |
| 6,760,429 | B1 | 7/2004 | Hung et al. |
| 6,804,345 | B1 | 10/2004 | Bala et al. |
| 7,028,091 | B1 | 4/2006 | Tripathi et al. |
| 7,028,331 | B2 | 4/2006 | Schwalb |
| 7,124,171 | B1 | 10/2006 | McCann |
| 7,224,783 | B2 | 5/2007 | Creamer et al. |
| 7,328,001 | B2 | 2/2008 | Dawson et al. |
| 7,403,995 | B2 | 7/2008 | Mace et al. |
| 7,480,719 | B2 | 1/2009 | Inoue |
| 7,610,388 | B2 | 10/2009 | Yamamoto |

(Continued)

FOREIGN PATENT DOCUMENTS

| WO | WO-2010025110 A1 | 3/2010 |
| WO | WO-2010025112 A1 | 3/2010 |
| WO | WO-2010025113 A1 | 3/2010 |

OTHER PUBLICATIONS

"U.S. Appl. No. 12/201,671, Final Office Action mailed Dec. 14, 2010", 24 pgs.

(Continued)

*Primary Examiner* — Andy Ho
*Assistant Examiner* — Abdou Seye
(74) *Attorney, Agent, or Firm* — Crawford Maunu PLLC

(57) ABSTRACT

In a system, at least one web server provides an interface to a web-enabled application to a first computing device, with the web-enabled application and the at least one web server belonging to a first domain. An interaction routing module routes a contact event to the first computing device. At least one application server receives and responds to an Hypertext Transfer Protocol (HTTP) request for requested information related to the contact event. The HTTP request is generated by the web-enabled application. An integration module receives the HTTP request from the at least one application server and translates the HTTP request to an application programming interface call to interface with a second computing device storing the requested information in a second domain. A messaging module provides the requested data to the web-enabled application.

25 Claims, 10 Drawing Sheets

U.S. PATENT DOCUMENTS

| | | | |
|---|---|---|---|
| 7,627,658 B2 | 12/2009 | Levett et al. | |
| 7,644,172 B2 | 1/2010 | Stewart et al. | |
| 7,730,204 B2 | 6/2010 | Pak | |
| 2002/0198943 A1 | 12/2002 | Zhuang et al. | |
| 2003/0123640 A1 | 7/2003 | Roelle et al. | |
| 2003/0172131 A1 | 9/2003 | Ao | |
| 2003/0195934 A1 | 10/2003 | Peterson et al. | |
| 2003/0195943 A1 | 10/2003 | Bradshaw et al. | |
| 2003/0208754 A1 | 11/2003 | Sridhar et al. | |
| 2003/0236907 A1 | 12/2003 | Stewart et al. | |
| 2004/0083292 A1 | 4/2004 | Lueckhoff et al. | |
| 2004/0088300 A1 | 5/2004 | Avery et al. | |
| 2005/0041647 A1 | 2/2005 | Stinnie | |
| 2005/0047579 A1 | 3/2005 | Mansour | |
| 2005/0135600 A1 | 6/2005 | Whitman | |
| 2006/0026304 A1 | 2/2006 | Price | |
| 2006/0224688 A1* | 10/2006 | Morris | 709/217 |
| 2006/0239440 A1 | 10/2006 | Shaffer et al. | |
| 2007/0127665 A1 | 6/2007 | Brandt et al. | |
| 2007/0162908 A1 | 7/2007 | Erickson et al. | |
| 2007/0174454 A1* | 7/2007 | Mitchell et al. | 709/225 |
| 2007/0192415 A1 | 8/2007 | Pak | |
| 2008/0037760 A1 | 2/2008 | Boughton et al. | |
| 2008/0072264 A1 | 3/2008 | Crayford | |
| 2008/0177994 A1 | 7/2008 | Mayer | |
| 2008/0178278 A1 | 7/2008 | Grinstein et al. | |
| 2008/0267386 A1* | 10/2008 | Cooper | 379/265.06 |
| 2009/0055195 A1 | 2/2009 | Karlsgodt | |
| 2009/0061850 A1 | 3/2009 | Li et al. | |
| 2009/0064148 A1 | 3/2009 | Jaeck et al. | |
| 2009/0066788 A1 | 3/2009 | Baum et al. | |
| 2009/0133031 A1 | 5/2009 | Inoue | |
| 2009/0190728 A1 | 7/2009 | Bushnell et al. | |
| 2009/0216683 A1 | 8/2009 | Gutierrez | |
| 2009/0234635 A1* | 9/2009 | Bhatt et al. | 704/2 |
| 2010/0054439 A1 | 3/2010 | Salame et al. | |
| 2010/0054448 A1 | 3/2010 | Townsend et al. | |
| 2010/0054450 A1 | 3/2010 | Southwick et al. | |
| 2010/0054451 A1 | 3/2010 | Townsend | |
| 2010/0057927 A1 | 3/2010 | Southwick et al. | |
| 2010/0058234 A1 | 3/2010 | Salame et al. | |
| 2010/0232583 A1 | 9/2010 | Bettis et al. | |
| 2011/0274261 A1* | 11/2011 | Casalaina et al. | 379/93.23 |

OTHER PUBLICATIONS

"U.S. Appl. No. 12/201,671, Non-Final Office Action mailed Jun. 28, 2010", 21 pgs.

"U.S. Appl. No. 12/201,671, Response filed Sep. 28, 2010 to Non Final Office Action mailed Jun. 28, 2010", 11 pgs.

"U.S. Appl. No. 12/201,726 Non-Final Office Action mailed Oct. 12, 2010", 17 pgs.

"U.S. Appl. No. 12/201,726, Response filed Jan. 12, 2011 to Non-Final Office Action mailed Oct. 12, 2010", 13 pgs.

"International Application Serial No. PCT/US2009/054780, Search Report mailed Oct. 8, 2009", 4 pgs.

"International Application Serial No. PCT/US2009/054780, Written Opinion mailed Oct. 8, 2009", 5 pgs.

"International Application Serial No. PCT/US2009/054787, Search Report mailed Oct. 13, 2009", 4 pgs.

"International Application Serial No. PCT/US2009/054787, Written Opinion mailed Oct. 13, 2009", 6 pgs.

"International Application Serial No. PCT/US2009/054788, Search Report mailed Oct. 13, 2009", 4 pgs.

"International Application Serial No. PCT/US2009/054788, Written Opinion mailed Oct. 13, 2009", 5 pgs.

Brown, Donald E, "The Interaction Center Platform", Interactive Intelligence, Inc., (2005), 35 pgs.

Fielding, et al., "HTTP/1.1: Connections, 8 Connections", Part of Hypertext Transfer Protocol—HTTP/1.1, RFC 2616, [Online]. Retrieved from the Internet Jan. 12, 2011: <URL:, 6 pgs.

Infrequently Noted, "Comet: Low Latency Data for the Browser", [Online]. Retrieved from the Internet: <URL: comet-low-latency-data-for-the-broswer>, (Mar. 3, 2006), 5 pgs.

McCarthy, Philip, "Ajax for Java developers: Write scalable Comet applications with Jetty and Direct Web Remoting", [Online]. Retrieved from the Internet: <URL: java/library/j-jettrdwr/index.html>, (Jul. 17, 2007), 16 pgs.

\* cited by examiner

INTERACTION MANAGEMENT

TECHNICAL FIELD

This application relates generally to methods and systems for managing networked contact centers and, more specifically, for a networked call center that integrates disparate call center resources.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2010, CONTACTUAL, INC., All Rights Reserved.

BACKGROUND

Traditionally, contact centers are referred to as call centers and designed to enable a company to handle calls from their clients. The calls received from the clients may be distributed to multiple call agents according to certain call distribution and handling methodologies. Ideally, a call center is designed to handle calls with minimal client waiting time, minimal dropped calls, even call distribution to agents, and minimal downtime. Any drastic fluctuations in one or more of these criteria may result in loss of business and/or customer dissatisfaction.

The call centers are normally configured to be operated on-premise using proprietary systems with propriety hardware and software. These on-premise call center systems are generally very costly to maintain. The systems typically require internal support staff. Furthermore, the systems may be inflexible in the type of applications and hardware that can be supported, limiting the company's ability to upgrade and grow along with any potential increase in demand. Even when the upgrade options are available, the options tend to be very costly and may require replacing a current system with another more advanced system, causing further stress to the supporting staff, the agents and the clients.

Ideally, the resources of a call center solution are monitored so that the call center is able to determine which resources are occupied and which resources are available. However, when real-time monitoring of the status of call center resources is desired, the on-premise call center solution may be impractical.

BRIEF DESCRIPTION OF DRAWINGS

Some embodiments are illustrated by way of example, and not limitation, in the figures of the accompanying drawings in which.

DETAILED DESCRIPTION

Figure 1:
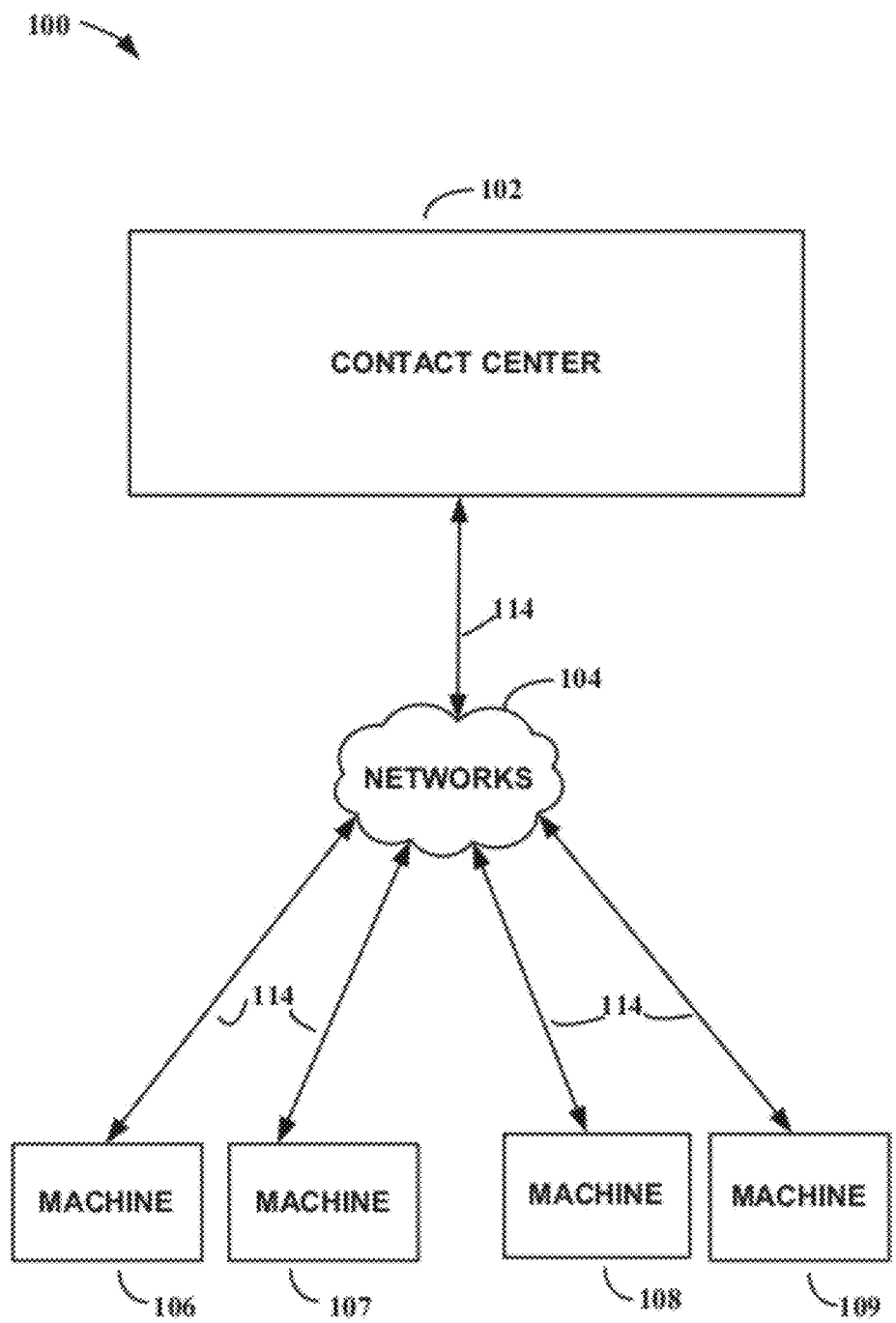
FIG. 1 is a high-level diagrammatic representation of an on-demand networked contact center, in accordance with an example embodiment.

For some example embodiments, methods and systems for managing interactions in networked contact centers are disclosed. An interface to a web-enabled application may be provided to a first computing device via a network. The web-enabled application may be in communication with a networked contact center, with the application and the contact center located in a first domain. A contact event may be transmitted via the interface to the web-enabled application. In response, a Hypertext Transfer Protocol (HTTP) request for information related to the contact event may be received by the first computing device. The HTTP request may be translated into an application programming interface (API) call to interface with a second computing device storing the requested information in a second domain. In response to the API call, the requested information related to the contact event may be received from the second computing device. The information may be provided to the web-enabled application.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Introduction

Methods and systems for managing interactions in networked contact centers are described herein. In one example embodiment, a networked contact center is a hosted service to provide services such as responses to telephone calls, email, instant messages, chats, short message service ("SMS"), and video. An example networked contact center is described in more detail below with reference to FIG. 1. The methods and systems for managing interactions described in the example embodiments herein may facilitate cross-domain information retrieval and display, real-time monitoring of agent statuses, and integration and presentation of data from multiple data sources in a user interface mashup. Additionally, managing interactions of networked contact centers according to the example embodiments described herein may reduce the number of data requests through the publication of events to a shared message bus and subscription to published events.

Interactions may refer to transactions between agents and customers or entities seeking assistance from a networked contact center. Interactions may further refer to the requests and responses occurring between an agent machine and the networked contact center. Managing interactions permits efficient use of agent resources and minimization of time spent by customers waiting for assistance.

For some example embodiments, the networked contact center may provide an integrated environment for conducting contact center interactions. The integrated environment may be able to access both locally maintained data and data maintained on remote, third party systems. Access to these resources may occur seamlessly from an agent's perspective as an agent user interface may issue an HTTP request for data, which may be routed through and translated at the networked contact center into an appropriate API call to access remotely stored data. Thus, an agent conducting a contact center interaction is able to gather data from disparate sources in a centralized location without resorting to separate and multiple authentications for each data source.

A conventional company providing contact center services, lacking the integration capabilities described herein, may not have access to third party data stores or may have to conduct additional authentication steps to obtain access. Methods and systems for managing interactions of networked contact centers thus offer an ability to manage customer and agent interactions within a single integrated web-enabled application.

Networked Contact Center

FIG. 1 is a block diagram showing an example networked contact center 100, in accordance with an example embodiment. FIG. 1 is shown to include a networked contact center 102 that is communicatively coupled with networks 104, via transmission media 114. Also communicatively coupled with the networks 104, via the transmission media 114, are machines 106-109. One or more of the machines 106-109 may be used by call agents or call supervisors associated with a company (also referred to as a tenant). One or more of the machines 106-109 may be used by customers or potential customers of the company.

The networks 104 may be used to communicatively couple the networked contact center 102 with the machines 106-109. In an example embodiment, networks 104 include the Internet and a public switched telephone network (PSTN). Other types of networks may be included within the networks 104 without departing from the claimed subject matter. The transmission media 114 may include any transmission media appropriate for supporting the networks 104. In an example embodiment, the transmission media 114 may include one or more of optical fiber, twisted pairs and wireless media. Other transmission media not described may also be used.

Contact made between the networked contact center 102 and the various machines 106-109 may include various modes of communications (e.g., electronic communications) that may be digitally encoded, composed of analog signals and/or include a combination of digital and analog communication. Some example types of contact may include communications made via Voice Over Internet Protocol (VoIP), analog telephone, online chat, text messaging, electronic mail (email), video conferencing, screen sharing, web conferencing and file sharing, radio broadcast, among other things. It is to be appreciated that example forms of communication are provided herein to illustrate types of contact and not to limit the meaning of contact to certain forms of communication.

The networked contact center 102 may perform various contact related tasks (described in more detail below), on behalf of one or more tenants. The networked contact center 102 may be implemented in software, hardware or a combination of both software and hardware. The networked contact center 102 may comprise contact center machines, modules, or components (not shown) that execute instructions to perform the various contact related tasks (e.g., call distribution, call routing, call prioritizing, call transferring, etc.). One or more of the contact center machines may include interface hardware to communicate with the machines 106-109 via the transmission media 114 and the networks 104. It may be noted that the number of customers, agents or supervisors (and e.g., machines used by the customers, agent and supervisors) that communicate with the networked contact center 102 may be significantly increased when the number of tenants supported by the networked contact center 102 also increases. One or more of the contact center machines may be responsible for storing data associated with the one or more tenants. The data may include, for example, tenant-specific call configuration, agents' identifications, supervisors' identifications, call recordings, call statistics, among other things. For some example embodiments, there may be multiple instances of the same data that may be used as backup and for recovery purposes.

Tenant

A tenant is an entity (e.g., a company, an employer, etc.) that seeks to address contact made by other entities (e.g., customers, employees, associates, etc.) with which the tenant has a relationship. To help respond to such contact, an example tenant may use the networked contact center 102 to receive the contact, organize the contact, allocate the contact, transmit the contact and to perform other contact center related services for the benefit of the tenant. In addition to using the networked contact center 102, a tenant may look to yet further entities (e.g., agents, consultants, business partners, etc.) to help address the various contacts referred to above (e.g., contact from the customers, associates, etc.).

Entities such as, for example, agents and customers may transmit and/or receive communications using the machines 106-109. The machines 106-109 may include interface hardware (not shown) and software to transmit and/or receive communications via the transmission media 114 to and/or from the networks 104 and the networked contact center 102. It is to be noted that the machines 106-109 may represent different types of machines (e.g., personal computers (PCs), mobile devices, telephones or any other network device). In an example embodiment, an entity associated with the machine 106 is a tenant's agent and a different entity associated with the machine 108 is the tenant's customer. In various example embodiments, on behalf of the tenant, the agent using the machine 106 may communicate via the networks 104 and the networked contact center 102 with the customer who is using the machine 108.

Contact Center Functional Modules

Figure 2:
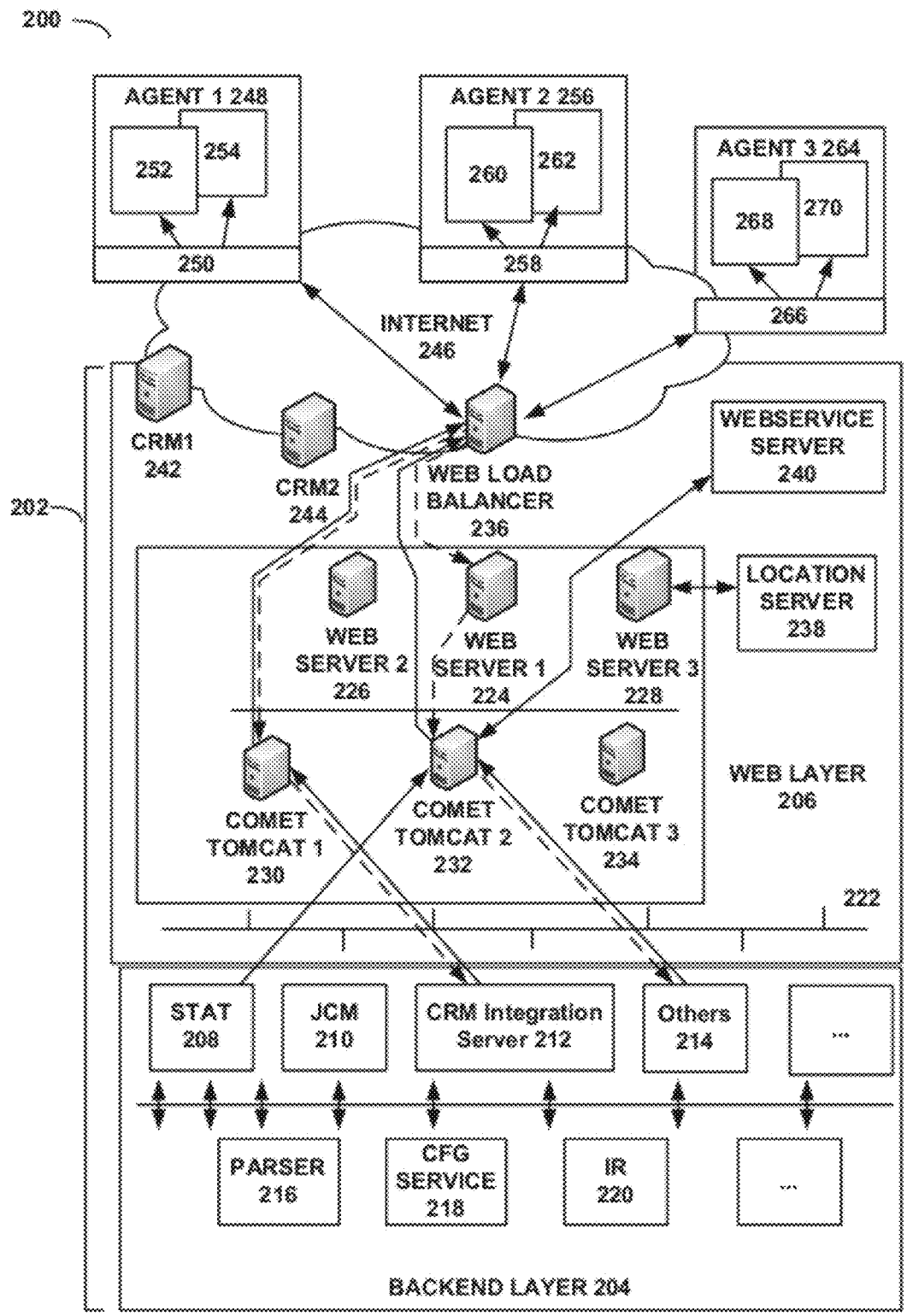
FIG. 2 is a block diagram illustrating a networked contact center, in accordance with an example embodiment.

FIG. 2 is a block diagram illustrating a network 200, in accordance with an example embodiment. The network 200 is shown to include an example networked contact center 202 communicatively coupled with agent systems 248, 256, and 264 via the Internet 246. The example networked contact center 202 is shown as including a backend layer 204 and a web layer 206. The backend layer 204 may include one or more servers, modules, or components comprising hardware, software, or a combination of hardware and software elements. The backend layer components may provide various contact center functionality, including, but not limited to, routing incoming calls to available agents and receiving and processing requests from agents for information about callers. The various backend layer components as shown are communicatively coupled to web layer elements. The connections between backend layer components and web layer components are merely exemplary; it is contemplated that additional connections are possible between components of the two layers. The web layer 206 may include one or more web servers 224, 226, 228, one or more Java application servers 230, 232, 234, and one or more web service servers 240. In one non-limiting embodiment, the Java application servers 230, 232, 234 support Apache Tomcat. The web servers 224, 226, 228 and application servers 230, 232, 234 may be communicatively coupled to a web load balancer 236 in communication with the agent systems 248, 256, 264 via the Internet 246. In an example embodiment, the web service server 240 may be a third party web service server that provides web services enabling the networked contact center 202 or one of its components to interface with a third party system. One or more customer relationship management ("CRM") systems 242, 244 are shown to be communicatively coupled to the agent machines 248, 256, 264 via the Internet 246. A location server 238 may be employed to aid in routing calls to available agents. A Java Message Server ("JMS") bus 222 may pass messages among the components of the web layer 206 or between components of the web layer 206 and the backend layer 204.

Although the current example may illustrate agents associated with one tenant, it is to be understood that the networked contact center 202 may be configured to support or host multiple tenants (and therefore may also be referred to as a hosted networked contact center or just a hosted contact center). For some example embodiments, the tenants may not need to install any call-distribution system on-premise. To host these multiple tenants, the networked contact center 202 may include multiple platforms and databases to store configurations specific to each tenant. The networked contact center 202 may also implement backup and recovery schemes to reduce system down time.

Figure 3:
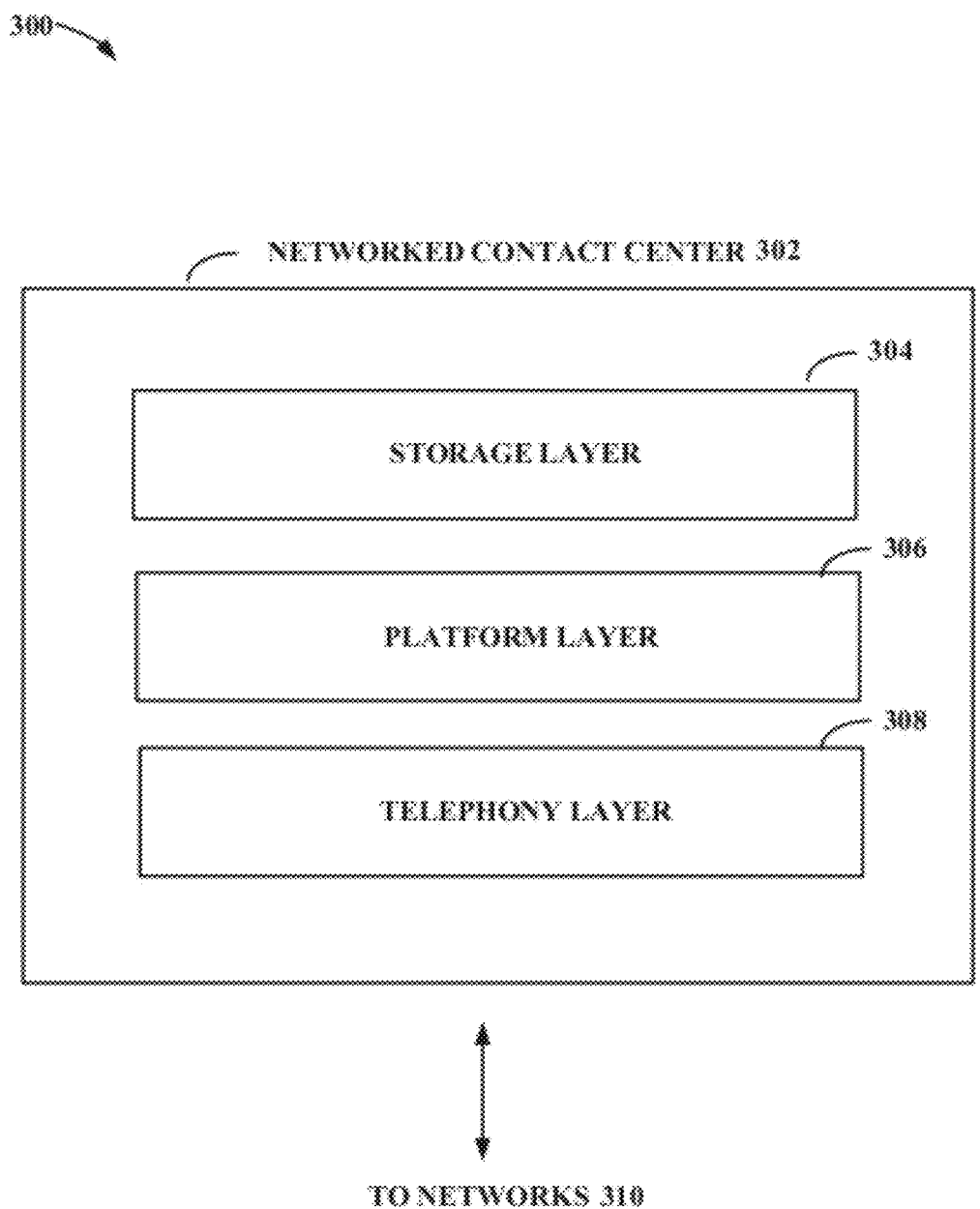
FIG. 3 is a block diagram illustrating a network including a networked contact center organized into layers, in accordance with an example embodiment.

FIG. 3 is a block diagram illustrating a further network 300 including networked contact center 302 organized into layers, in accordance with an example embodiment. The networked contact center 302 may be substantially similar to the networked contact center 202 of FIG. 2. The networked contact centers 202, 302 may be organized into multiple logical groups or layers. There may be a storage layer 304, a platform layer 306 and a telephony layer 308. For some example embodiments, the telephony layer 308 may be responsible for receiving calls that come into the networked contact centers 202, 302. Depending on the dialed number associated with the call, the telephony layer 308 distributes the call to an appropriate platform in the platform layer 306. For some example embodiments, each platform in the platform layer 306 may be associated with one or more machines (also referred to as platform machines). Although the networked contact center 202 of FIG. 2 is illustrated with one platform, it is contemplated that multiple platforms may be supported by the networked contact center 202 of FIG. 2. Each set of platform machines may support one or more tenants. For some example embodiments, each tenant may be associated with two or more platforms. A first platform may be used as a primary platform, and a second platform may be used as a backup platform. Incoming calls distributed to a tenant may always be directed to the primary platform unless the tenant is reconfigured to direct the incoming calls to the backup platform. For some example embodiments, the backup platform is operational while the primary platform is operational even when all calls are being processed by the primary platform. This may be valuable when there are problems with the primary platform, since switching the operations to the backup platform may not cause too much delay in the call handlings associated with the tenant.

For some example embodiments, the multiple platforms in the platform layer 306 may share the same data in the storage layer 304. The storage layer 304 may be associated with databases and associated database machines. The storage layer 304 may itself be partitioned into multiple images for backup and recovery and for efficient access. For some example embodiments, mapping may be used to relate a tenant on a particular platform to the tenant's data in the storage layer 304.

Thus, the networked contact center 302 may include logic to receive calls, to determine to which of the multiple supported tenants the calls belong, to distribute the calls to the right platform, and to determine where the data associated with the tenant may be found.

Using the organization described above, the networked contact center 302 may be easily upgraded and maintained with little or minimal impact to the tenant. For example, a tenant may be operating with a backup platform while the primary platform is upgraded from one software level to another software level. Once the upgrade is completed, operations may be switched back to the primary platform. Similarly, because both the primary platform and the backup platform share the same data in the storage layer 304, switching from the backup platform to the primary platform can be accomplished with minimal impact to the tenant and system availability. It may be noted that some calls may be affected during the switch; however, as is typical with telephone calls, the customers may re-dial or call the tenant again. It may be likely that the re-dialed calls may be received by the networked contact center 302 after the switch is complete.

Referring again to FIG. 2, the components of the backend layer 204 may be associated with a single platform or may be associated with multiple platforms. The backend layer components may further be communicatively coupled with third party databases (not shown) to retrieve data related to a tenant or customer. The machines and modules of FIG. 2 are to be described in further detail with respect to FIG. 4, which follows.

Flow Diagram

Figure 4:
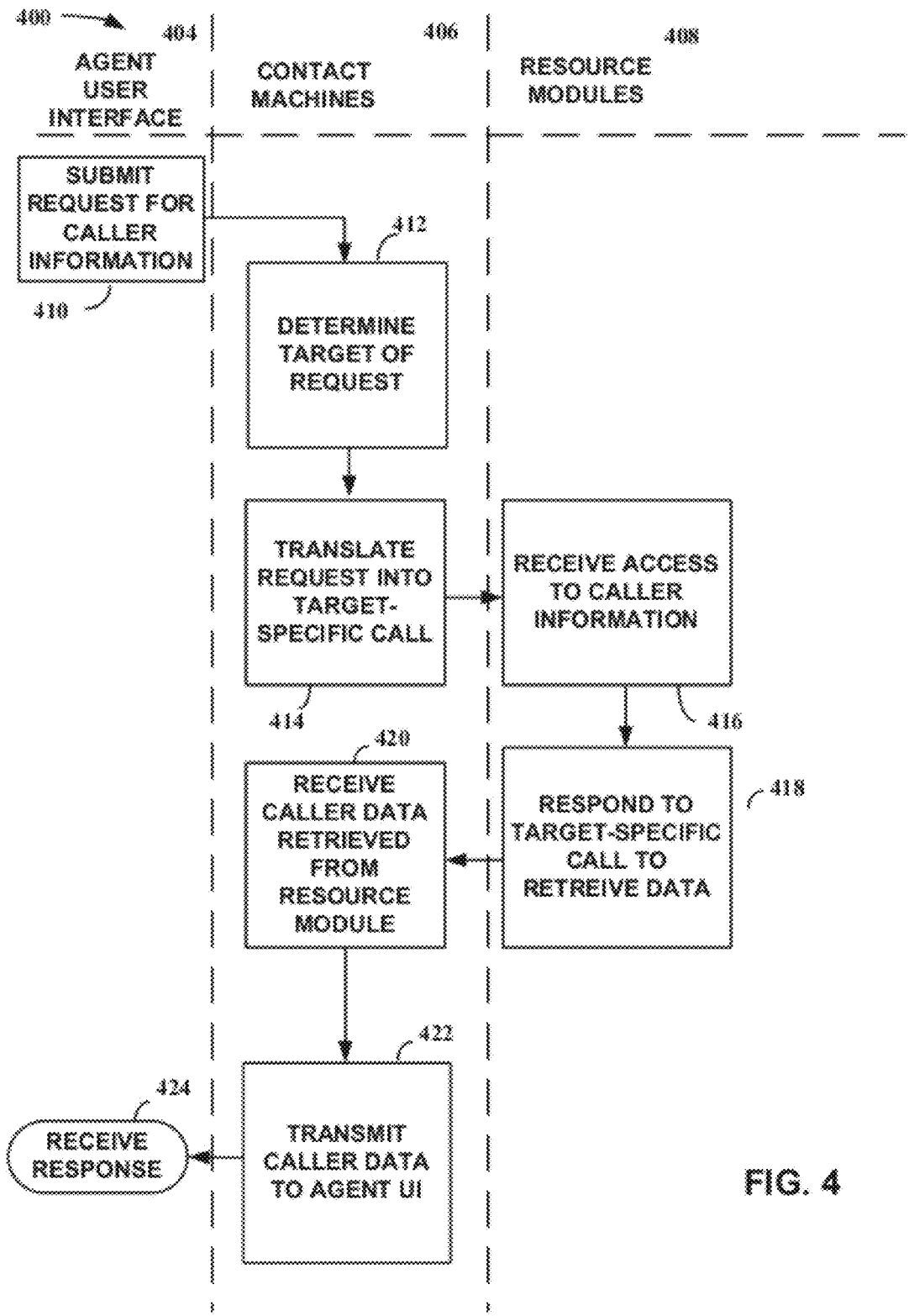
FIG. 4 is a flow diagram illustrating example actions performed by various contact center components in response to agent contact, in accordance with an example embodiment.

FIG. 4 is a flow diagram 400 showing example actions performed by various components of a contact center for responding to agent or customer contact, in accordance with an example embodiment. In FIG. 4, each column represents a lane in which action(s) are carried out. Actions in lanes 404, 406, 408 may be performed by certain machines and/or modules shown in FIG. 2. It may be noted that a module may represent software, hardware and/or a combination of software and hardware used to implement logical constructions and/or to process instructions. Although shown in separate lanes, one module may be included in, or composed of, one or more of the other modules.

The flow diagram 400 may begin at block 410 with an agent machine submitting a request for information related to the identity of a person (e.g., a customer) requesting interaction with the agent via one or more communication channels. Prior to the submission of the request, the person seeking service from the tenant may contact the tenant via the networked contact center 202, which acts as an agent for the tenant. The contact with the networked contact center 202 may occur via one or more communication channels, such as by telephone, email, instant message, online chat, and text message. A backend component, such as a private branch exchange (PBX) (not shown), may receive the contact (e.g., telephone call, email, instant message) and generate an event corresponding to the contact. The event may be routed to an Interactive Voice Response (IVR) system (not shown), where the person making contact with the networked contact center may be prompted to provide information that may be used to assist an agent with handling the interaction. The event further may be transmitted to an Interaction Routing (IR) component 220 of the backend layer 204 to be routed to an available agent. The IR component 220 may have a listing of the status of the agents associated with the tenant at its disposal. The agent status data may be provided by a statistics engine 208 that maintains agent status data in a variety of metrics. The agent status data may be provided to the statistics engine 208 by a Jabber Communications Manager ("JCM") server 210. The JCM server 210 is a Java application server that consumes data from agent machines and translates the data for use in the backend layer 204. The JCM server 210 may further transmit data from the backend layer 204 to the web layer 206 for further transmission to agent machines 248, 256, 264. Using the status of the agents, the skills of the agents, and the information provided to the IVR system, the IR component 220 may determine which available agent is most suited to handle the interaction with the contactor and may route the contact event to that agent. Other backend components 214 (shown generally) may provide data and services as needed from the backend layer 204 to the web layer 206. For example, other backend components may include the backend PBX, databases, and components to interface with other systems.

As shown in FIG. 2, routing of the contact event (e.g., telephone call) to the agent involves routing the event from the backend layer 204 to the web layer 206, where an application server may transmit the event to a web load balancer 236 for further routing to the assigned agent. Upon receipt of the event, a screen pop may be generated in an agent user interface of a web-enabled application executing in an Internet browser installed on the agent's machine. The screen pop populates the agent's browser window with information pertaining to the contact event, such as the personal information of the person initiating contact with the contact center. One source of this information may be information gathered from the IVR system (not shown). The agent user interface (UI) of the web-enabled application may interact with the networked call center. The agent UI may be a mashup of multiple data sources, with data from each data source being provided in its own frame.

As the agent machine receives the contact event, the agent machine may submit a request for additional information concerning the contact event. The agent's browser generates an HTTP request to the backend layer of the networked contact center. To provide real-time functionality to the call center agent UI, the agent UI may be a web-enabled application that utilizes Asynchronous JavaScript and XML ("AJAX") and Comet technologies. The agent UI thus may provide real-time interaction with a networked contact center. This real-time interaction may be characterized by the web-enabled application retrieving and receiving data from the contact center in the background without affecting the state of the agent UI. As data is received by the agent UI, the user interface may be updated without refreshing the page. The agent UI may generate the HTTP request as an asynchronous request that uses a long polling COMET transport to keep a connection with the backend layer open while the data is retrieved. In an example embodiment, the web-enabled application may generate a persistent connection with the backend layer.

In block 412, the browser-generated HTTP request is received by the backend layer 204, where the target of the HTTP request may be determined. In one embodiment, a CRM integration server 212, such as a Contactual® CRM integration server, may receive the HTTP request. The HTTP request may be directed to data residing in a local CRM system or database or in a third party proprietary CRM system or database. If the HTTP request is directed to a local database or CRM system, because the agent machine and the networked contact center are located in the same domain, the browser call may be used to retrieve data from the local database or CRM system without having to translate the call. If the HTTP request is directed to a third party CRM system or database located in a different domain, in block 414, the CRM integration server 212 translates the HTTP request into a Web API call recognizable by the third party system or database using the exposed Web API of that third party system. For example, the agent UI may make a call for data to be retrieved from a Salesforce.com® CRM system or a NetSuite® CRM system. The agent UI may not have knowledge of the calling convention used by the Salesforce.com® CRM system or the NetSuite® CRM system. The backend CRM integration server may have knowledge of the Web APIs used to interface with third party systems. In this respect, the CRM integration server 212 may serve as a proxy for the agent machine browser, as the agent machine browser does not have knowledge of the APIs needed to interface with third party systems.

In block 416, the translated data request call is used to query the third party system for data relating to the person contacting the networked contact center 202. In block 418, in response to the query, the third party CRM system or database returns relevant data as a structured data response to the API call. In block 420, the CRM integration server 212 may receive the data from the third party system. In block 422, the CRM integration server 212 may push or otherwise provide the retrieved data to the agent UI application using the COMET transport. In block 424, the agent UI may receive the pushed data and update the user interface with the retrieved data.

Figure 5:
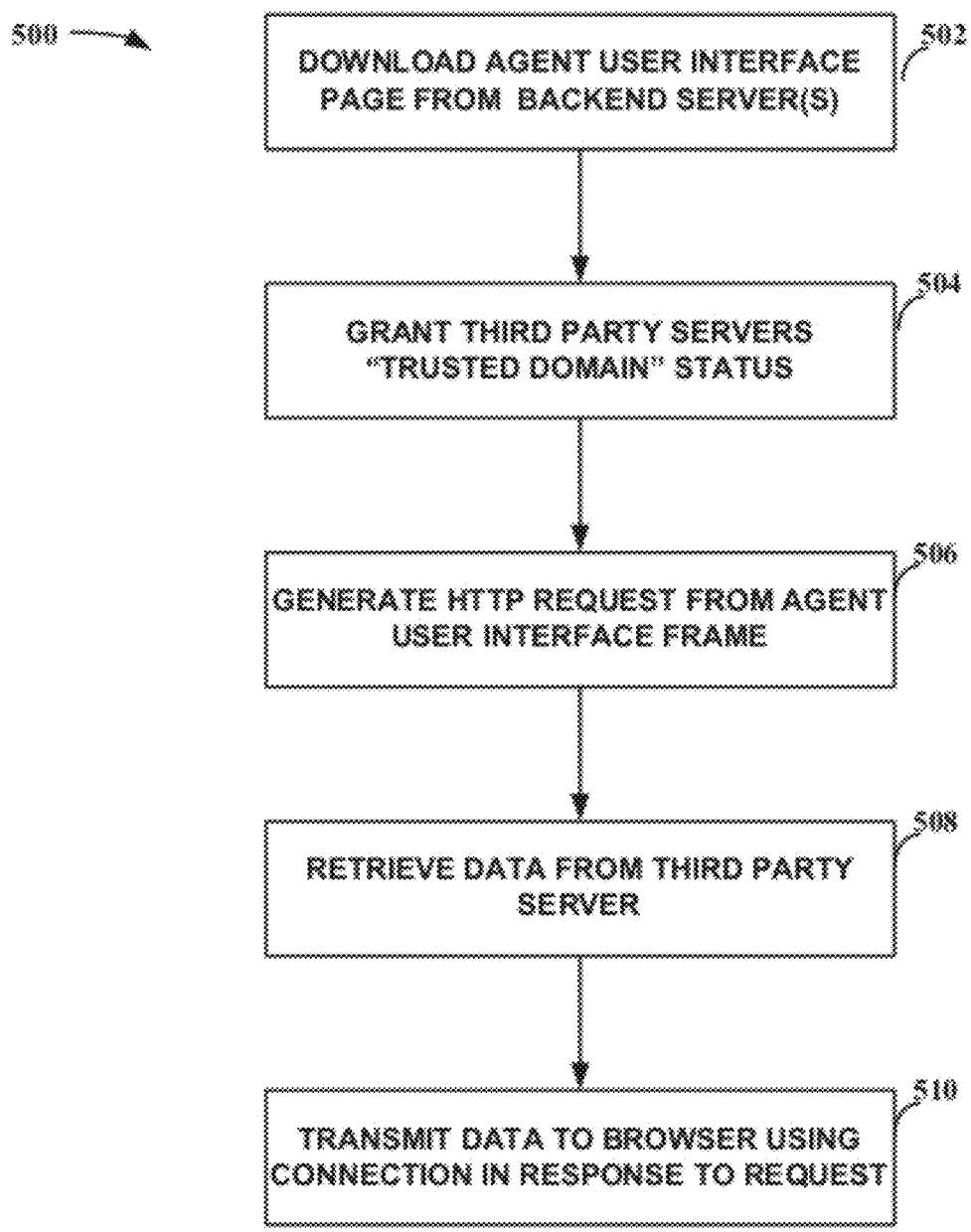
FIG. 5 is a flow diagram illustrating an example interaction between an agent machine and a networked contact center, in accordance with an example embodiment.

FIG. 5 is a flow diagram illustrating an example interaction between an agent machine and a networked contact center, in accordance with an example embodiment. The method 500 may be performed by processing logic (e.g. dedicated logic, programmable logic, microcode, etc.) that may comprise hardware, software (such as that run on a general-purpose computer system or a dedicated machine), or a combination of both. In one example embodiment, the method 500 may be performed by the various modules discussed above with reference to FIG. 2. Each of these modules may comprise processing logic.

As shown in FIG. 5, the method 500 may commence at operation 502, with an agent user interface being provided in an Internet browser on an agent machine. The agent user interface may be a web-enabled application provided as a web service by web and application servers of the networked contact center 202. The agent UI may be an application that leverages AJAX and COMET technologies to provide real-time interaction between the agent machine and the networked contact center. The agent UI web application may be a mashup, that is, the agent UI may interact with and display data from multiple data sources. Each data source may be given its own frame for displaying data in the agent UI. In one example embodiment, the frames in the web application may interact with each other and refresh upon one frame receiving updated data.

At operation 504, certain third party domains from which data is to be retrieved may be set as "trusted" domains in the Internet browser of the agent machine. A trust may enable the agent UI to engage in cross-domain communications to access resources residing in a different domain. For example, in the embodiment of FIG. 4, the agent UI did not have access to certain third party domains related to third party proprietary CRM systems. In the example embodiment of FIG. 5, by setting the third party proprietary CRM systems as "trusted" domains, the agent UI may be able to interface with the third party domains to access data stored in the third party CRM systems. Use of "trusted" domains may obviate the need for a proxy server to translate generic agent UI HTTP requests into appropriate third party CRM calls.

At operation 506, the agent UI, or one of its frames, may issue an HTTP request for data. The HTTP request may use a long polling COMET transport to open a persistent or long-lasting connection between the agent machine and the backend components of the networked contact center. By using a persistent or long-lasting connection, the number of connections between the agent machine and the contact center may be minimized.

At operation 508, data may be retrieved from the third party domain. By setting the third party domain as a "trusted" domain, the data may be retrieved from the third party domain without having to translate the HTTP request into a call that conforms to an exposed API for the third party domain. At operation 510, the retrieved data may be pushed back to the browser using the asynchronous long-polling connection. The agent UI may receive the retrieved data in the background and may update the requesting frame with the retrieved data.

Figure 6:
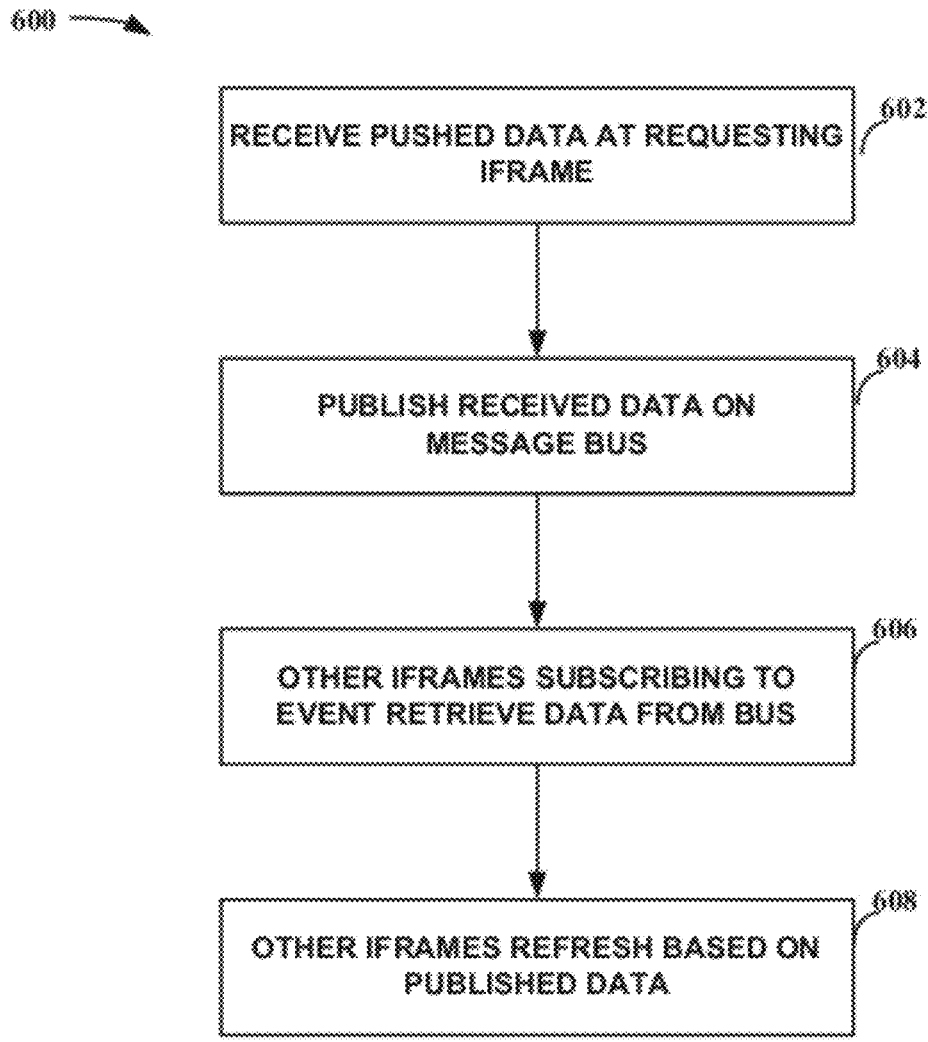
FIG. 6 is a flow diagram illustrating example interactions between components of an agent user interface, in accordance with an example embodiment.

FIG. 6 is a flow diagram illustrating example interactions between components of an agent user interface, in accordance with an example embodiment. The method 600 may be performed by processing logic (e.g. dedicated logic, programmable logic, microcode, etc.) that may comprise hardware, software (such as that run on a general-purpose computer system or a dedicated machine), or a combination of both. In one example embodiment, the method 600 may be performed by the various modules discussed above with reference to FIG. 2. Each of these modules may comprise processing logic.

At operation 602, agent systems 248, 256, and 264 each may include a Comet connection 250, 258, and 266, respectively, to connect the agent systems 248, 256, and 264 to the networked contact center 202. In an example embodiment, agent systems 248, 256, and 264 further may include an event publisher, such as a TIBCO PageBus Publisher, which is an open source message bus implemented in JavaScript. An inline frame ("Iframe") (e.g., elements 252, 254 of agent system 248, elements 260, 262 of agent system 256, elements 268, 270 of agent system 264) of an agent UI provided in an Internet browser window for interacting with a contact center may receive data in response to a request issued by the Iframe.

In one example embodiment, the data may be pushed to the Iframe by a backend component of the networked contact center 202. In one example embodiment, the JCM server 210 may receive the data from a data source (e.g., local CRM, database, third party CRM) and push the data to an application server supporting Apache Tomcat technologies. The data may then be transmitted from the application server to the agent UI. The Iframe may receive the data and update itself with the newly received data.

At operation 604, the requesting Iframe may publish the incoming event corresponding to the received data on a message bus. The requesting Iframe may publish the incoming event with a topic name. Each Iframe may have an instance of the message bus, while an outer frame surrounding the Iframes may be designated as the parent frame. The parent frame may have an instance of the message bus as well. Each frame may be an AJAX component. In one example embodiment, the incoming event may be published to the parent frame message bus instance. Alternatively, the incoming event may be published to the message bus instance of the requesting inline frame.

At operation 606, other Iframes who have subscribed to the topic may listen to the message bus and be alerted to the publication of an event having a topic name matching their subscription. At operation 608, the subscribing Iframes read the data off the bus and use the data to update themselves. In one example embodiment, publication of the data and incoming event may be implemented using TIBCO PageBus, an open source message bus implemented in JavaScript. The publication of data to other inline frames in the agent UI may eliminate redundant requests and retrievals of data that may occur if each inline frame submits the same request.

User Interface Example Embodiments

Figure 7:
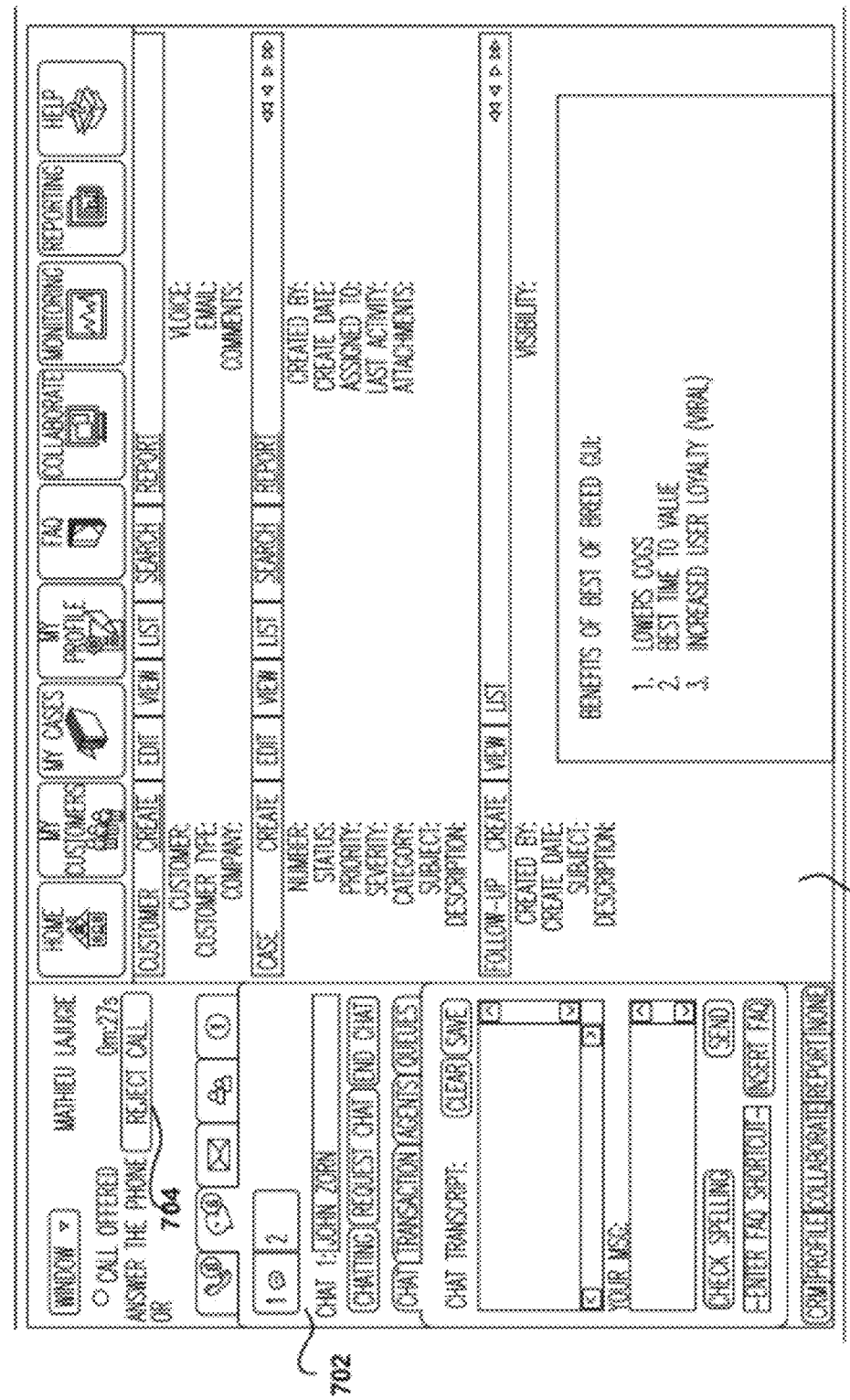
FIG. 7 is a block diagram illustrating a user interface, in accordance with an example embodiment.

FIG. 7 is a diagram illustrating a user interface 700, in accordance with an example embodiment. A graphical user interface ("GUI") is a type of user interface, which may permit users to interact with electronic devices like computers, hand-held devices (personal digital assistants (PDAs), MP3 players, portable media players, gaming devices, etc.), household appliances and office equipment. As opposed to traditional interfaces, a GUI presents graphical icons, visual indicators or special graphical elements called "widgets." Often the icons are used in conjunction with text, labels or text navigation to fully represent the information and actions available to a user. Instead of offering only text menus, or requiring typed commands, the actions are usually performed through direct manipulation of the graphical elements. In FIG. 7, an example agent UI is shown. The agent UI may be a web application executing in an Internet browser of an agent machine. The example embodiment of FIG. 7 illustrates an agent UI having two inline frames 702, 706. Frame 702 may be a control panel frame, in which an agent interacts with the networked contact center and entities contacting the tenant via the networked contact center. Frame 706 may be a CRM frame which displays data concerning the entity with whom the agent interacts. The CRM frame may display data received from a local CRM system or from a third party CRM system. It is contemplated that additional frames and different types of frames capable of displaying different types of data may be included in the agent UI.

The agent UI may include a button 704, titled "reject call." When the button 704 is enabled, the button 704 permits an agent to reject an incoming call. The agent may become aware of the incoming call when the button 704 starts blinking Blinking of the button 704 is an example of an event being pushed from the backend layer 204 to the interface 700. However, an event being pushed to a UI does make the button blink. In order for the UI to display a blinking button, a client side logic (not shown) may receive the event and then act on the event. Generally, the agent UI, or one of its frames, may generate requests and receive and act on events. For example, in the situation where a person calls a contact center using a telephone, an event may be generated at the backend of the networked contact center corresponding to the incoming call. The event may be sent by the JCM server 210 to the control panel frame 702 of the UI 700. This control panel frame 702 may detect the incoming event and may generate a call for additional data about the event in response. The call may be used to retrieve additional data from different domains, such as third party CRM servers, according to the embodiments described herein. When data is retrieved at the backend layer 204, the JCM server 210 may push the data to the control panel 702 via a web server in the web layer 206. The control panel 702 may publish the data on a message bus with a topic name. If the topic name associated with the data matches a topic name subscribed to by the CRM frame 706, the CRM frame may retrieve the data from the bus and use it to populate the data fields of the CRM frame.

Figure 8:
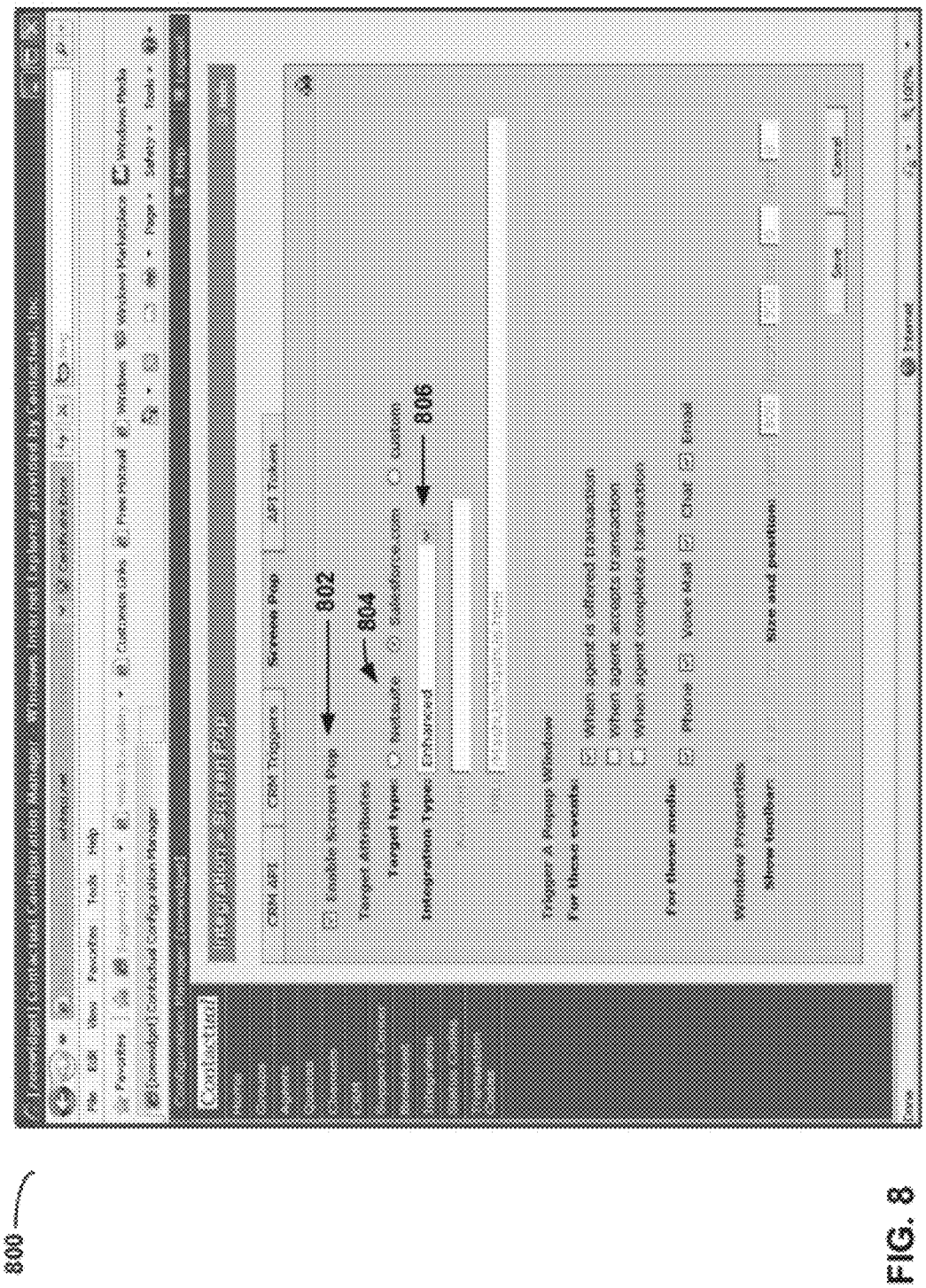
FIG. 8 is a block diagram illustrating a user interface, in accordance with an example embodiment.

FIG. 8 is a diagram illustrating a user interface 800, in accordance with an example embodiment. In FIG. 8, a configuration manager for the agent UI is shown. The configuration manager may provide user-selectable settings that control how the agent UI interfaces with cross-domain data sources, such as third party CRM servers. A checkbox option entitled "Enable Screen Pop" 802 controls whether the agent UI will be populated with data when an incoming call event is received by the agent. The user is able to specify the target system for integration 804 with the agent UI. Shown are options to integrate the agent UI with a Netsuite® CRM system, a Salesforce.com® CRM system, and a custom system. The user is able to select a type of integration 806, with FIG. 8 showing the selection of an "Enhanced" integration. The type of integration may relate to how the agent UI interfaces with the target integration type (e.g., Netsuite®, Salesforce.com®, custom). If a "Legacy" integration type (not shown) is selected, a pop-up browser window may appear when the agent UI attempts to interface with the targeted system. The pop-up browser window may re-direct the user to the targeted system's domain for authentication before allowing access to the targeted system. For example, if "Legacy" integration is selected, a user attempting to retrieve data from a Netsuite® system may encounter a pop-up window directed to a Netsuite authentication web page. If an "Enhanced" integration is selected, an inline frame in the agent UI will interface with the target integration type instead of popping up a window containing a native interface to the target integration type. When data from the target integration type is received, a screen pop will occur and data from the integration target will populate the inline frame.

Figure 9:
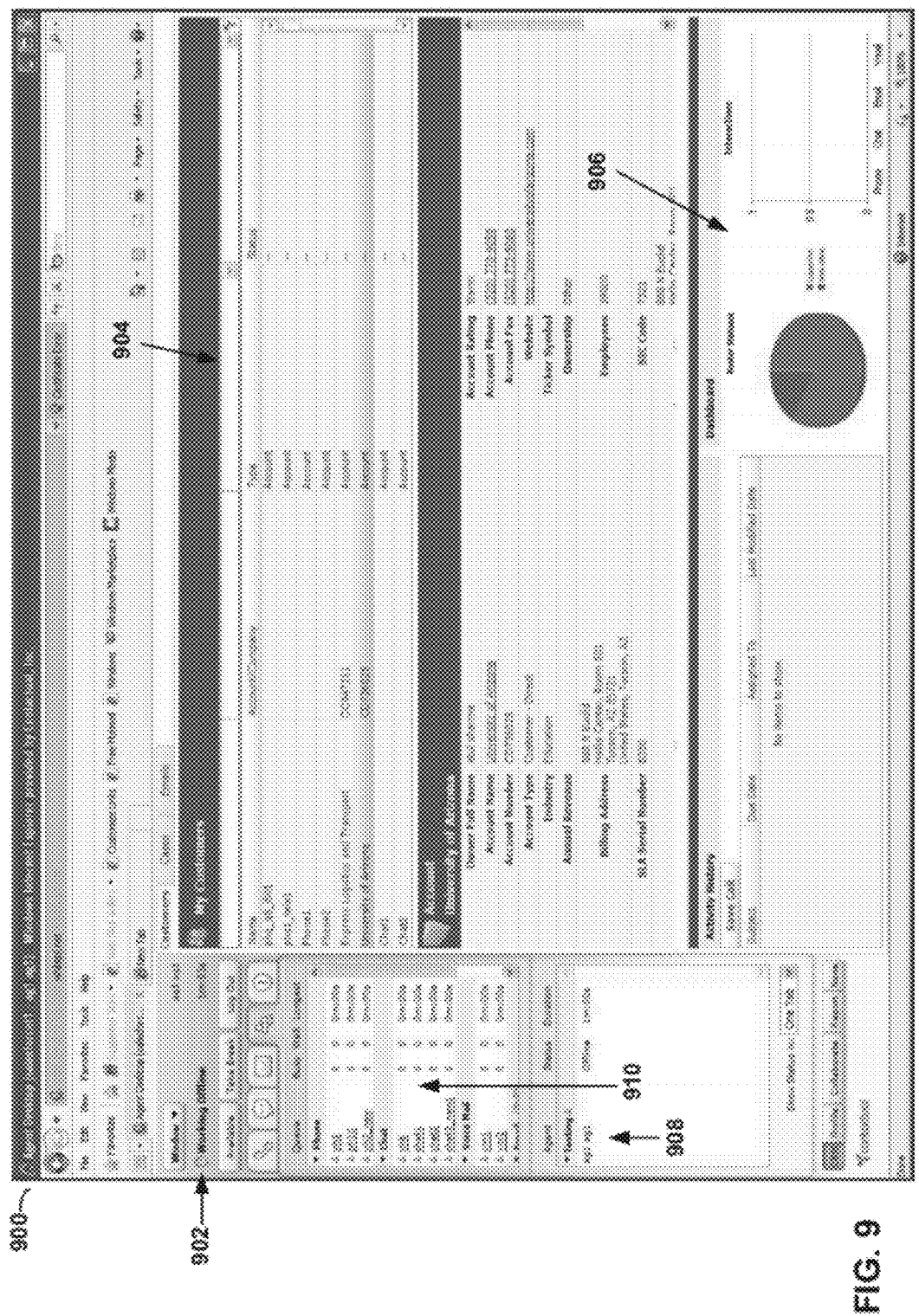
FIG. 9 is a block diagram illustrating a user interface, in accordance with an example embodiment.

FIG. 9 is a diagram illustrating a user interface 900, in accordance with an example embodiment. In FIG. 9, an example agent UI is shown. The agent UI may include a control panel frame 902 and a frame 904 displaying data obtained from a CRM system. Frame 906 may illustrate agent status metrics. The control panel frame 902 may permit real-time monitoring of agents according to a set of metrics, such as service levels versus goal, number of calls in progress, number of calls waiting, and the longest waiting interaction per queue. The control panel frame 902 may include a window 908 displaying a roster of agents acting on behalf of a tenant, their respective status, and how long the agent has been interacting with a customer. The control panel frame may further include one or more queues 910 directed to one or more communication channels, with each queue displaying one or more metrics by which to measure agent interaction. The status of agents may be constantly updated through the pushing of data from the backend layer 204 of the networked contact center 202 to the UI and browser via a long-lasting or persistent connection between the UI and the backend layer 204 of the networked contact center 202.

Figure 10:
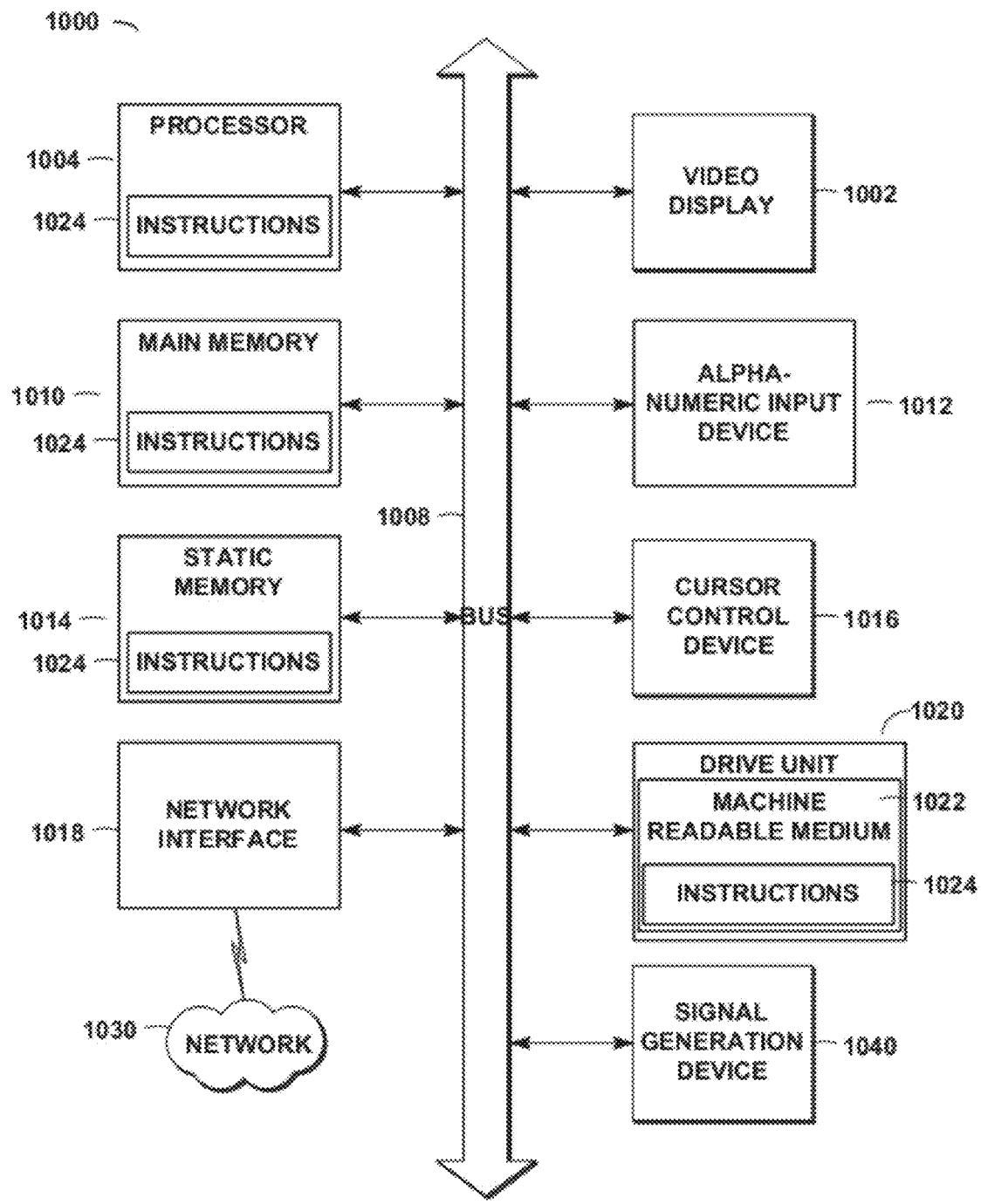
FIG. 10 is a diagrammatic representation of an example machine in the form of a computer system within which a set of instructions for causing the machine to perform any one or more of the methodologies discussed herein may be executed.

FIG. 10 shows a diagrammatic representation of a machine in the example form of a computer system 1000 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a PC, a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1004 (e.g., a central processing unit (CPU), a graphics processing unit (GPU) or both), a main memory 1010 and a static memory 1014 which communicate with each other via a bus 908. The computer system 1000 may further include a video display unit 1002 (e.g., a liquid crystal display (LCD) or a cathode ray tube (CRT)). The computer system 1000 also includes an alphanumeric input device 1012 (e.g., a keyboard), a cursor control device 1016 (e.g., a mouse), a disk drive unit 1020, a signal generation device 1040 (e.g., a speaker) and a network interface device 1018.

The disk drive unit 1020 includes a machine-readable medium or computer-readable medium 1022 on which is stored one or more sets of instructions 1024 (e.g., software) embodying any one or more of the methodologies or functions described herein. The instructions 1024 may also reside, completely or at least partially, within the main memory 1010 and/or within the processor 1004 during execution thereof by the computer system 1000, the main memory 1010 and the processor 1004 also constituting machine-readable media.

The instructions 1024 may further be transmitted or received over a network 1030 via the network interface device 1018. While the machine-readable medium 1022 is shown in an example embodiment to be a single medium, the terms "machine-readable storage medium" and "computer-readable storage medium" should be taken to include a single medium or multiple media (e.g., a centralized or distributed database, and/or associated caches and servers) that store the one or more sets of instructions. The terms "machine-readable medium" and "computer-readable storage medium" shall also be taken to include any medium that is capable of storing, encoding or carrying a set of instructions for execution by the machine and that cause the machine to perform any one or more of the methodologies of the present subject matter. The terms "machine-readable medium" and "computer-readable storage medium" shall accordingly be taken to include, but not be limited to, solid-state memories, optical and magnetic media, and carrier wave signals.

The above description is intended to be illustrative and not restrictive. For example, the above-described embodiments (or one or more aspects thereof) may be used in combination with each other. Other embodiments will be apparent to those of skill in the art upon reviewing the above description. The scope of the claims should, therefore be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," and so forth are used merely as labels and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. In addition, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A computer-implemented method, comprising:
   providing an interface to a web-enabled application to a first computing device via a network, the web-enabled application in communication with a networked contact center in a first domain;
   transmitting a contact event to the web-enabled application;
   receiving, from the first computing device, a Hypertext Transfer Protocol (HTTP) request for requested information related to the contact event;
   selecting, from a plurality of remote systems storing information, a remote system that stores the requested information and that is located in a second domain;
   identifying an application programming interface (API) call for interfacing with a second computing device of the selected remote system;
   translating the HTTP request into the identified application programming interface (API) call to interface with the second computing device storing the requested information in the second domain;
   receiving the requested information from the second computing device; and
   providing the requested information to the web-enabled application.

2. The computer-implemented method of claim 1, further comprising establishing a long lasting connection between the web-enabled application and an application server of the networked contact center using a long polling COMET transport.

3. The computer-implemented method of claim 1, wherein the interface to the web-enabled application has a plurality of inline frames, the inline frames in communication with each other via a message bus.

4. The computer-implemented method of claim 3, wherein a first inline frame of the plurality of inline frames of the interface receives the requested information and publishes the requested information with a topic on the message bus, wherein a second inline frame of the plurality of inline frames subscribing to the topic retrieves the requested information from the message bus, and wherein the second inline frame updates data displayed in the second inline frame with the requested data.

5. The computer-implemented method of claim 1, further comprising monitoring a status of the first computing device in real-time, the monitoring including receiving status data from the first computing device and translating the status data for use with a statistics engine.

6. The computer-implemented method of claim 1, further comprising generating a screen pop on the interface of the web-enabled application, the screen pop populating data fields of the interface with the contact event and the requested data.

7. The computer-implemented method of claim 1, further comprising updating the interface of the web-enabled application with the requested data without refreshing the interface.

8. A system, comprising:
   at least one web server that includes hardware circuitry configured to provide access to a web-enabled application to a first computing device, the web-enabled application and the at least one web server belonging to a first domain;
   an interaction routing module configured to route a contact event to the first computing device;
   at least one application server that includes hardware circuitry configured to receive and respond to an Hypertext Transfer Protocol (HTTP) request for requested information related to the contact event, the HTTP request generated by the web-enabled application;
   an integration module configured and arranged to
      receive the HTTP request from the at least one application server;
      determine whether the requested information is stored on at least one web server belonging to the first domain; and
      translate, in response to determining that the requested information is not stored on at least one web server belonging to the first domain, the HTTP request to an application programming interface call to interface with a second computing device storing the requested information in a second domain; and
   a messaging module configured to provide the requested information to the web-enabled application.

9. The system of claim 8, wherein the at least one application server is configured to establish a long lasting connection with the web-enabled application using a long polling COMET transport.

10. The system of claim 8, wherein the web-enabled application includes a user interface having a plurality of inline frames, the inline frames in communication with each other via a message bus.

11. The system of claim 10, wherein a first inline frame of the plurality of inline frames of the user interface receives the requested information and publishes the requested information with a topic on the message bus, wherein a second inline frame of the plurality of inline frames subscribing to the topic retrieves the requested information from the message bus, and wherein the second inline frame updates data displayed in the second inline frame with the requested data.

12. The system of claim 8, further comprising a load balancing module configured to distribute contact events, data, and HTTP requests among the at least one web server.

13. The system of claim 8, further comprising a location server configured to identify an agent among a plurality of agents to allocate the contact event.

14. The system of claim 8, wherein the messaging module is further configured to receive data from the first computing device and to translate the data into status data.

15. The system of claim 14, further comprising a statistics engine configured to receive the status data from the messaging module and to track a status of an agent using the status data.

16. A non-transitory computer-readable storage medium storing a set of instructions that, when executed by a processor, causes the processor to perform operations comprising:
providing an interface to a web-enabled application to a first computing device via a network, the web-enabled application in communication with a networked contact center in a first domain;
transmitting a contact event to the web-enabled application;
receiving, from the first computing device, a Hypertext Transfer Protocol (HTTP) request for requested information related to the contact event;
selecting, from a plurality of remote systems storing information, a remote system that stores the requested information and that is located in a second domain;
identifying an application programming interface (API) call for interfacing with a second computing device of the selected remote system;
translating the HTTP request into the identified application programming interface (API) call to interface with the second computing device storing the requested information in a second domain;
receiving the requested information related to the contact event from the second computing device; and
providing the requested information to the web-enabled application.

17. The non-transitory computer-readable storage medium of claim 16, further comprising establishing a long lasting connection between the web-enabled application and an application server of the networked contact center using a long polling COMET transport.

18. The non-transitory computer-readable storage medium of claim 16, wherein the interface to the web-enabled application has a plurality of inline frames, the inline frames in communication with each other via a message bus.

19. The non-transitory computer-readable storage medium of claim 18, wherein a first inline frame of the plurality of inline frames of the interface receives the requested information and publishes the requested information with a topic on the message bus, wherein a second inline frame of the plurality of inline frames subscribing to the topic retrieves the requested information from the message bus, and wherein the second inline frame updates data displayed in the second inline frame with the requested data.

20. The non-transitory computer-readable storage medium of claim 16, further comprising monitoring a status of the first computing device in real-time, the monitoring including receiving status data from the first computing device and translating the status data for use with a statistics engine.

21. The non-transitory computer-readable storage medium of claim 16, further comprising generating a screen pop on the interface of the web-enabled application, the screen pop populating data fields of the interface with the contact event and the pushed data.

22. The non-transitory computer-readable storage medium of claim 16, further comprising updating the interface of the web-enabled application with the requested data without refreshing the interface.

23. An apparatus, comprising:
means for providing an interface to a web-enabled application to a first computing device via a network, the web-enabled application in communication with a networked contact center in a first domain;
means for transmitting a contact event to the web-enabled application;
means for receiving, from the first computing device, a Hypertext Transfer Protocol (HTTP) request for requested information related to the contact event;
means for determining at which of a plurality of remote systems the requested information is stored;
means for translating, in response to determining that the requested information is stored on one of the plurality of remote systems, the HTTP request into an application programming interface (API) call to interface with a second computing device of the determined one of the plurality of remote systems that stores the requested information in a second domain;
means for receiving the requested information from the second computing device; and
means for providing the requested information to the web-enabled application.

24. The apparatus of claim 23, further comprising means for monitoring a status of the first computing device in real-time, the means for monitoring including means for receiving status data from the first computing device and means for translating the status data for use with a statistics engine.

25. The apparatus of claim 23, further comprising means for establishing a long lasting connection between the web-enabled application and an application server of the networked contact center using a long polling COMET transport.

* * * * *